United States Patent [19]

Taylor

[11] 4,226,361
[45] Oct. 7, 1980

[54] POSITIVE IDENTIFICATION SYSTEM FOR AUTHENTICATING THE IDENTITY OF A CARD USER

[76] Inventor: Leonard H. Taylor, 14335 Huston St., #207, Sherman Oaks, Calif. 91423

[21] Appl. No.: 955,319

[22] Filed: Oct. 27, 1978

[51] Int. Cl.$^2$ .......................... G06K 7/06; G09B 3/00; H01H 43/08; G06K 5/00
[52] U.S. Cl. ..................... 235/380; 35/9 B; 200/46; 235/441
[58] Field of Search ............ 35/6, 9 B, 48 B; 340/149 A, 149 R; 200/46; 235/379, 380, 381, 382, 435, 441

[56] References Cited

U.S. PATENT DOCUMENTS

| | | | |
|---|---|---|---|
| 2,175,944 | 10/1939 | McGrath | 35/9 B |
| 3,089,255 | 5/1963 | Thompson | 35/9 B |
| 3,430,200 | 2/1969 | Barney | 340/149 A |
| 3,514,754 | 5/1970 | Schwend | 340/149 A |
| 3,643,064 | 2/1972 | Hudson | 340/149 A |
| 3,809,784 | 5/1974 | Munafo | 35/9 B |
| 4,032,931 | 6/1977 | Haker | 35/6 |

*Primary Examiner*—Robert M. Kilgore
*Attorney, Agent, or Firm*—Blakely, Sokoloff, Taylor & Zafman

[57] ABSTRACT

A system for providing a low cost means for deterring the fraudulent use of lost or stolen credit cards, checks, or other instruments. The system employs low cost means for encoding documents, and a device for determining whether the document user has been issued a secret code corresponding encoding on the document. The device uses manually operated entering means thereby eliminating the need for large and costly document reading means. Further, the device is comprised of hidden switching pairs and is constructed so that the relationship between the switching pairs and the entering means is destroyed if the device is tampered with.

15 Claims, 10 Drawing Figures

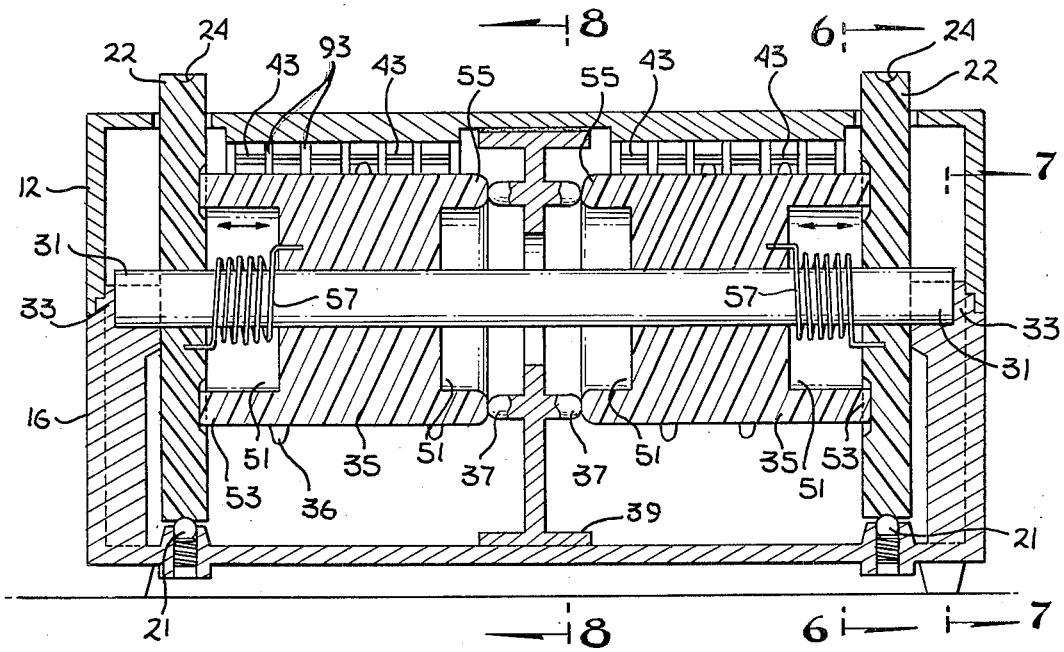
Fig. 5
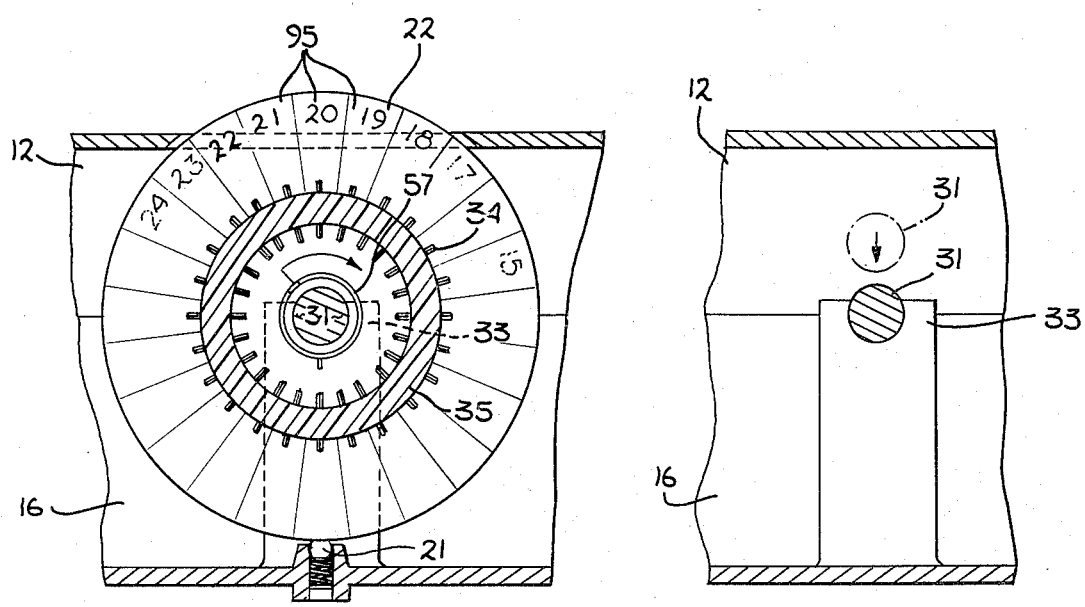
Fig. 6
Fig. 7

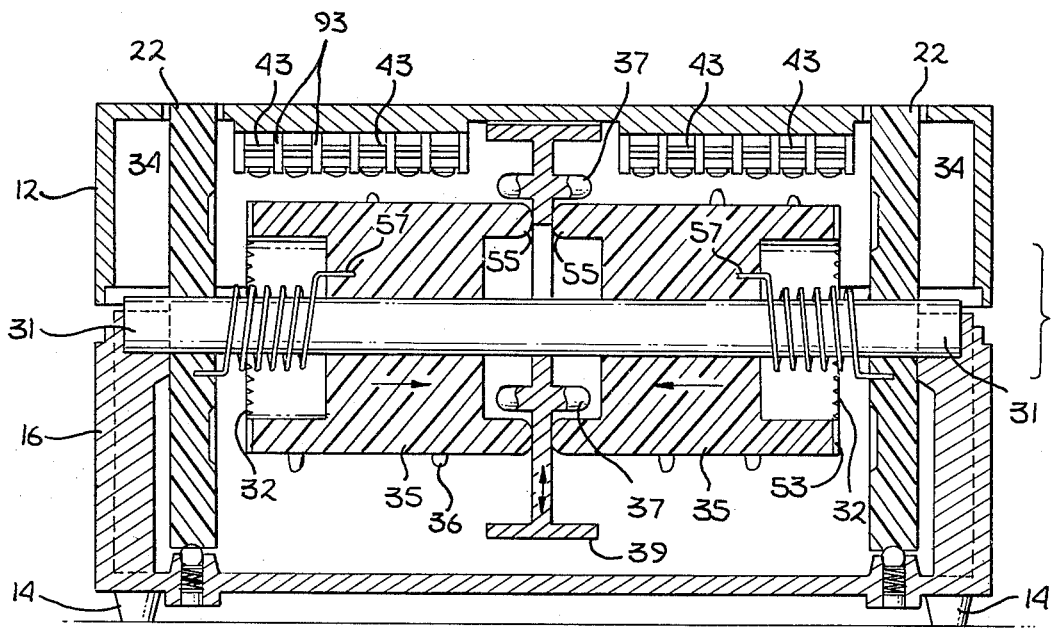
Fig. 9
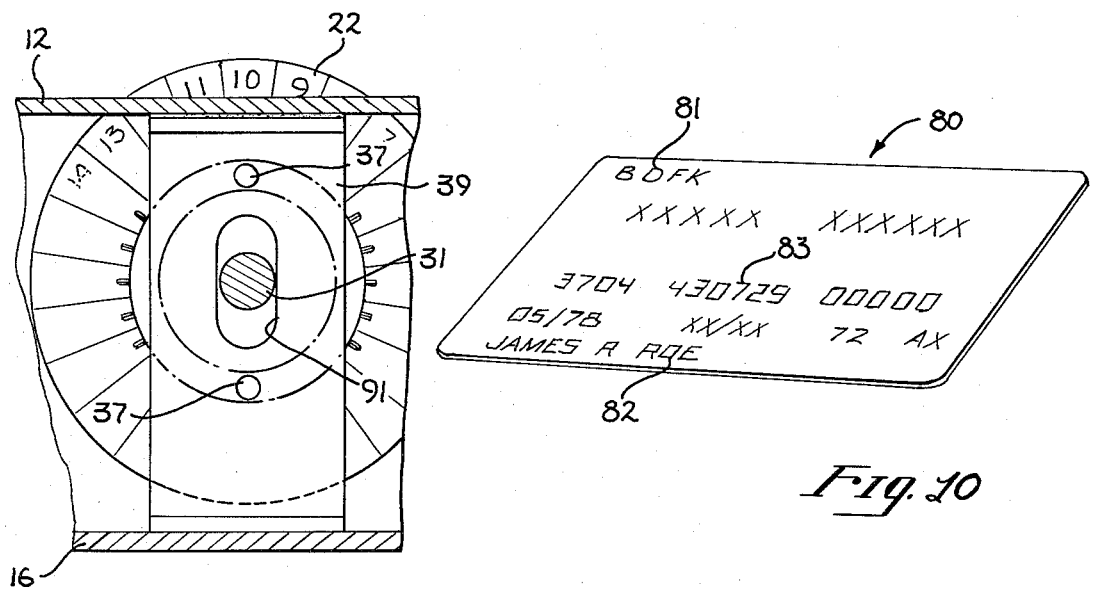
Fig. 8
Fig. 10

4,226,361

POSITIVE IDENTIFICATION SYSTEM FOR AUTHENTICATING THE IDENTITY OF A CARD USER

BACKGROUND OF THE INVENTION

1. Field of the Invention

This invention relates to a system for authenticating the identity of the user of an encoded document.

2. Prior Art

The use of credit cards in today's society is ever present. Credit cards are used to represent an exchange of money for goods and services in almost all locations and in almost all types of commercial establishments, including banks, restaurants, department stores, gas stations, tourist attractions, theaters, supermarkets and other retail outlets. Unfortunately, along with the almost universal use of credit cards there is a large incidence of credit card theft and subsequent use by unauthorized users. The most common method of checking whether the user is authorized to use the card that is being presented to complete a transaction is to compare the user's signature with the one on the signature strip. However, these comparisons are cursory at best, and the person making the comparison is rarely capable of detecting even the most rudimentary of forgeries. These signature comparisons are sometimes augmented by the employment of centralized credit information agencies. However, references to such agencies merely confirm that the cards or other instruments are authentic and that funds are available. These references do not confirm the identity of the user.

Previous attempts to provide means for verifying that the person using a credit card was the one authorized to do so have not proven to be successful. The systems previously produced have been overly complex and difficult to use by either the customer or the merchant or both. These systems have often been large and bulky. They have been difficult to manufacture and are very expensive. Many of the previous systems require access to a computer, which is a large expense occurring on a continuing basis. Because of the problems inherent with previous systems, their use has not been widespread. Because of the high costs involved, only large financial institutions have been able to use the previous systems. However, few of these institutions have found it advantageous to use any of the systems previously known. The previous systems for verifying the identity of a credit card user are impracticable for use by commercial establishments, particularly retail stores, gas stations and restaurants.

In addition, previous systems required complex encoding of credit cards. Such encoding included magnetic coding, which is very expensive and very susceptible to accidental alteration, and hole punching, which generally weakens the durability of the card.

Previous systems include the credit card verifier described by Appleton in U.S. Pat. No. 4,016,404. This system required a credit card reader and a specially adapted keyboard. These units make that system bulky and expensive and allow for more instances of unreliability. It employs microprocessor components which tends to increase the difficulty of manufacture and the costs of the system.

The system described by McCune, et al. in U.S. Pat. No. 4,016,405 requires a credit card reader, a keyboard, complex logic circuitry, including timing circuitry, a display unit, and access to a centralized computer. This system is very large, very expensive and is designed to be used by large financial institutions, preferably in cooperation with each other.

The system disclosed in Norwich, U.S. Pat. No. 3,728,522 requires a magnetically encoded card, a card reader, a writing unit, and complex circuitry. It also requires a series of actions by the system's operator.

The system described by Housman in U.S. Pat. No. 3,906,201 requires complex logic circuitry which, as described above, increases the cost of manufacture of the card verifying systems. This system also provides for the effective destruction of the card if a wrong entry is made, leaving little margin of error. The card itself must have electric circuitry embedded in it which greatly increases the cost of manufacturing the credit cards.

The systems described above are representative of the prior art which has so far produced bulky or stationary systems. These systems are complex and expensive and impracticable for widespread use.

SUMMARY OF THE INVENTION

The above-mentioned disadvantages of the previously known credit card systems have prevented their use on a scale of any consequence. Accordingly, it is an object of this invention to provide a system for authenticating the identity of a card user.

It is a further object of this invention to provide a system for authenticating the identity of a card user which is simple to manufacture and may be produced at low cost.

It is a further object of this invention to provide a system for authenticating the identity of a card user which is capable of being held in the hand of its operator.

It is a further object of this invention to provide a system for authenticating the identity of a card user which is difficult to decode.

It is a further object of this invention to provide a system for authenticating the identity of a card user which will be capable of being used by a wide spectrum of commercial establishments so as to act as a deterrent to credit card thefts and the monetary losses which usually result from such thefts.

The above objects are accomplished by the present invention. The system of this invention is comprised of a positive identification device and a card bearing visible identification indicia. The authentication device is a small, light-weight device which can be easily held in one's hand. It has at least one (1) dial for the entry of a secret code by the card user. Each dial is connected to a cylinder which has numerous protuberances on it. Each cylinder is positioned in close proximity to lever members which each make electrical contact at one end of the lever when the other end of the lever is contacted by a protuberance on the cylinder. The electrical contacts made by the levers form part of an electrical circuit which is completed upon the closure of appropriate verification switches on the authentication device. The protuberances are positioned on the cylinders so that for each setting of the secret code entry dials, a different group of verification switches must be thrown to make a complete circuit. The positive identification device also comprises an identity authentication indicator lamp and a source of electricity, usually a battery, which make up the rest of the circuit which is completed upon the closing of verification switches.

The cards are manufactured in the usual way, with each card being encoded with visible identification information in the same manner that account numbers are embossed on the cards. The authorized user of the credit card is then given a secret code. Before being allowed to make a commercial transaction, the card user must enter his secret code on the secret code entry dials of the authentication device of this invention. The operator of the commercial establishment then closes verification switches on the authenticating device which correspond to the visible identification information on the card. If the secret code number entered into the authentication device correctly complements the visible identification information on the card, a simple electric circuit is completed in the authentification device upon the closing of the verification switches on the device by the operator of the commercial establishment and an identity authentication indicator lamp lights up indicating that the card user is the authorized user and the transaction can proceed.

If the credit card user is not an authorized user, the unauthorized user would not know the secret code which complements the visible identification information on the card. Consequently, the number entered on the secret number entry dials of the positive identification device would not cause a commpletion of an electric circuit within the device upon the throwing of the verification switches by the operator of the commercial establishment. Therefore, the identity authentication indicator lamp would not light up. To insure that the positive identification device is not faulty, the test button is depressed to light the indicator lamp. If it lights up, then, depending upon the policy of the commercial establishment, the operator could merely refuse to allow the use of the credit card in the transaction or the operator could call upon the appropriate authorities to deal with the suspected unauthorized user of the credit card.

Because the authentication device of this invention is small and lightweight, easy to operate and inexpensive to manufacture, it is capable of enjoying widespread use across the spectrum of commercial establishments, and is particularly suitable for distribution by credit card companies. Therefore, it can readily be seen that the present invention will act as a major deterrent to credit card thieves.

The system of the present invention can readily be used in situations other than those involving credit transactions. For example, the system may be used to authenticate the identity of one holding a document used to identify those allowed entry to limited access areas such as government installations, schools or construction sites.

The relationship between the visible identification information and secret number codes can be changed periodically by a simple realignment of the dials and cylinders. Thereby new groupings of electrical connections are formed so that old secret codes become inoperative. Concurrent with the realignment of the dials and cylinders, each authorized card user is notified of the new secret code which is to be used with the visible identification information on the card in the user's possession. Thus, any effort by unauthorized card users to learn the secret code to match the visible information on a card would be for nought.

The positive identification device is constructed so that the cylinders separate from the secret number entry dials if the device is opened for examination. Therefore, any attempt to elicit current secret code numbers by examining the device would be stymied because the mechanical connection between the dials and cylinders is destroyed.

BRIEF DESCRIPTION OF THE DRAWINGS

FIG. 5 is a front cross-sectional view of the device taken along line 5—5 of FIG. 3.

FIG. 6 is a cross-sectional view taken along line 6—6 of FIG. 5.

FIG. 7 is a partial cross-sectional view of the device taken along line 7—7 of FIG. 5.

FIG. 8 is a partial cross-sectional side view of the device taken along line 8—8 of FIG. 5.

FIG. 9 shows the device of FIG. 5 after it has been partially taken apart.

FIG. 10 shows a card encoded for use in the system of the present invention.

DETAILED DESCRIPTION OF THE INVENTION

Figure 1:
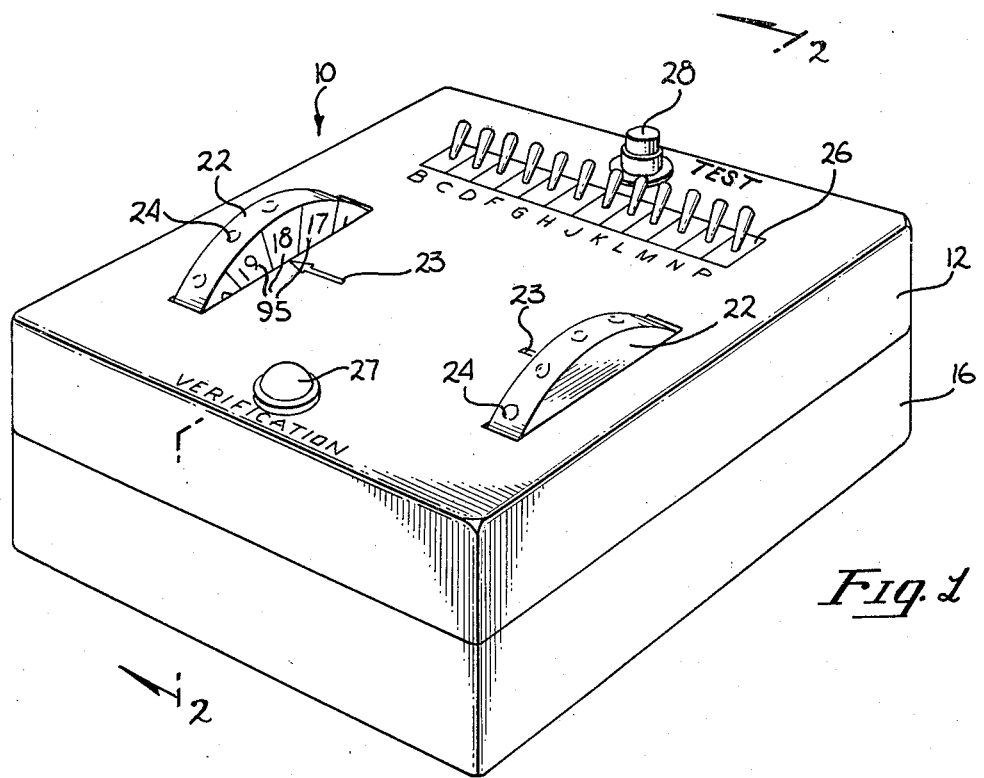
FIG. 1 is a perspective view of the positive identification device used in the system of the present invention.

Referring to FIG. 10, card 80 is typical of the type of document used in the system of the present invention. Usually it will be a credit card. The card is manufactured in the usual way, with visible identification information 81 embossed on the card in the same manner that the authorized user's name 82 and account number 83 are. In the preferred embodiment, the visible identification information 81 is a series of alphabetical characters. These characters could also be numerical or otherwise symbolical. The characters of the visible identification information are four (4) in number, chosen from the first twelve (12) consonants of the English alphabet. It is clear that the visible identification information could include greater or fewer than four (4) characters.

Figure 2:
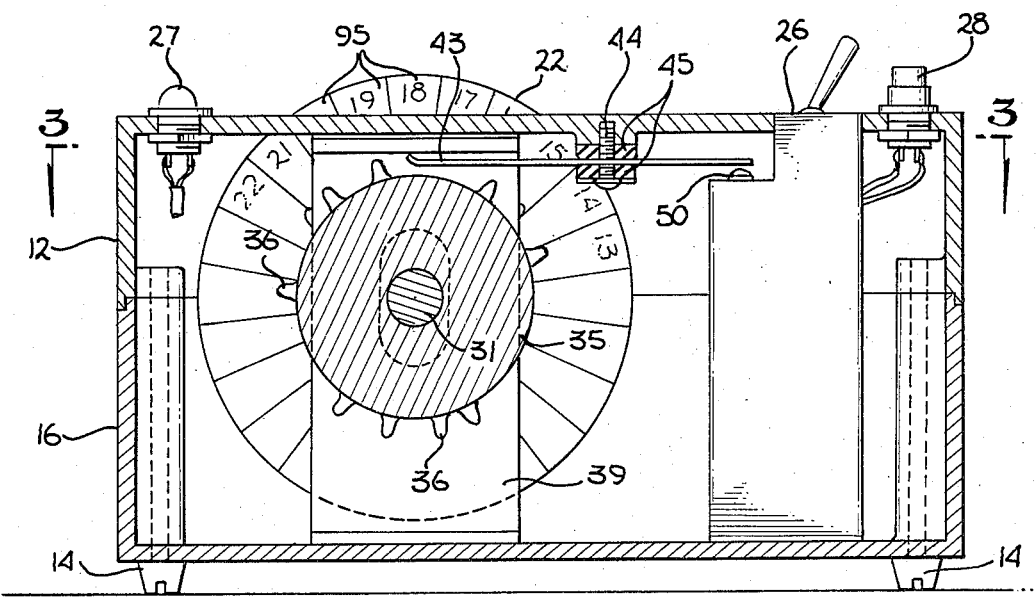
FIG. 2 is a sectional view of the positive identification device taken along line 2—2 of FIG. 1

FIG. 1 shows the authentication device 10 of this invention. The device is housed in a case composed of a top body member 12 and a bottom body member 16. The case is produced in a manner well known in the art and can be made of a variety of materials. In the preferred embodiment the case is made of molded plastic. Pads 14, shown in FIG. 2, are attached to the lower side of bottom body member 16 and can be made of almost any resilient material.

Secret code entry dials 22 (also called "user dials") appear through slots in the top body member 12. The preferred embodiment of the present invention has two secret code entry dials, but other embodiments may have greater or fewer dials. Each dial has marked upon it a series of numbers 95 in FIG. 1 and a corresponding number of detents 24 which come in contact with a detent ball 21, shown in FIG. 5, so that the dial does not slip from its setting. Detents 24 are placed on the rims of the dials and the numerical markings appear on the inside edges. In other embodiments these positions can be reversed. In the preferred embodiment of the present invention, the authorized card user is given a four (4) digit code, which complements the visible identification information 81 on the user's card, to memorize. It is upon the user dials 22 that the card user enters his secret code during identification authentication procedures. For example, if his secret code is 1826, the card user will set the left and right secret code entry dials so that the numerical markings 18 and 26 respectively align with arrows 23.

Visible identification information entering means 26 (also referred to as "verification switches") appear through another slot in top body member 12. In the preferred embodiment of the present invention there are twelve (12) verification switches identified by alphabetical characters, here the first twelve consonants of the English alphabet. A greater number or a fewer number of switches can be used, and the switches can be identified by numerical or other symbolic characters. In the preferred embodiment, the verification switches are in a bank of single throw switches. In other embodiments, the visible identification entering means may be similar to the user dials.

The operator of the positive identification device 10, usually an operator of a commercial establishment, closes the verification switches which correspond to the characters of visible identification information 81 on the user's card 80. For example, if the characters of the visible identification information are BDFK, the operator closes verification switches B, D, F and K. If the card user had entered the correct secret code onto the secret code entry dials, an identity authentication indicator would respond. The indicator could respond to alert the operator to the fact that the user is unauthorized. The indicator could be a buzzer. In this embodiment it is a lamp 27 which lights up indicating that the card user is an authorized user. If the lamp does not light up, then the operator depresses test switch 28. This is done to insure that the power source, usually a battery 29, shown symbolically in FIG. 4, and the identity authentication indicator lamp are in operating order. If the lamp lights up upon the depressing of the test switch, the operator knows that the credit card user has entered an incorrect code on dials 22. Depending on the policy followed, the operator could allow the user to repeat the process, the operator may refuse to allow the use of the card in the transaction or the operator may call the appropriate authorities to deal with the suspected unauthorized card user. If lamp 27 does not light up when test switch 28 is closed, then the operator can replace the lamp or the battery (the access to the battery is not shown) or both. In this procedure there is never a need to insert the card, or any other document, into the device.

Figure 4:
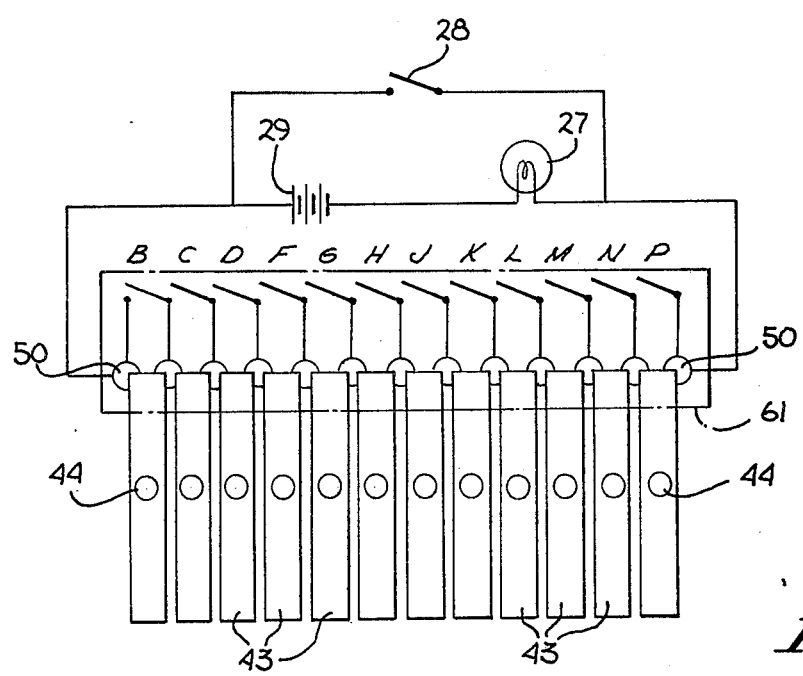
FIG. 4 is a schematic diagram of the electrical circuit used in the authentication device of FIG. 1.

Referring to FIG. 4, the circuit of the device of this invention is shown in schematic form. When test switch 28 is depressed and battery 29 and lamp 27 are in working order, a completed circuit exists and lamp 27 lights up. During normal use, test switch 28 stays open. Battery 29 and lamp 27 are connected to an electrical circuit which comprises two sets of switches, the first set of switches ("first switches") corresponding to the user code dials 22 and the second set of switches ("second switches") corresponding to the visible identification information entering means 26. The number of switches in the first set is equal to the number of switches in the second set. Lamp 27 only lights up when electrical circuit 61 is enabled. By the present invention the electrical circuit is enabled only upon the activating of second switches which are complementary to the first switches actuated. Each switch of the first set is wired to a respective switch of the second set forming switching pairs, the number of switching pairs of course being equal to the number of first switches, each switching pair comprising one first switch and one second switch. The electrical circuit is enabled only upon the actuating of either the first switch or the second switch of all the switching pairs. The electrical circuit could be formed in a variety of manners, including connecting the first switch and the second switch of each switching pair in series and then connecting all the switching pairs together on parallel, the electrical circuit being enabled upon either the first switch or the second switch of all of the switching pairs being opened.

In the preferred embodiment the first switch and the second switch of each switching pair are connected in parallel and the switching pairs are all connected in series, the electrical circuit being enabled upon either the first switch or the second switch of all the switching pairs being closed.

In the preferred embodiment the first set of switches is comprised of electrical contacts 50 and the conductive end portion of levers 43. Each lever 43 and each successive pair of contacts 50 comprise a first switch. It is obvious that the second set of switches could be formed in the same way. In the preferred embodiment, however, the set of second switches is identical to verification switches 26.

Referring to FIG. 5, user dials 22 are mounted on axle 31. The user dials rotate in either direction, independently of each other. The user dials are mounted next to rotating members which in the preferred embodiment are cylinders 35. Each end of each cylinder is hollowed out so that circular cavities 51 are formed. Narrow interlocking rims 53 and narrow spacer rims 55 are thus formed out of the ends of the cylinders. The cylinders are kept pressed up against the user dials by spacers 37 located on I-beam 39. Spacers 37 engage spacer rims 55 during normal operation of the device. Spacers 37 are of narrow width so that when I-beam 39 is displaced by a small amount, spacers 37 and spacer rims 55 disengage.

As shown in FIG. 9, interlocking rims 53 have a tooth and notch pattern 32 in them. User dial 22 has a complementary tooth and notch pattern 34 in its side, as shown in FIG. 6, so that when spacers 37 engage spacer rims 55, the user dial and the cylinder it is mounted next to mesh together and rotate as one unit, as shown in FIG. 5.

Referring to FIG. 2, cylinders 35 have upon their surfaces means for coupling with switch actuators, said switch actuators to be discussed subsequently. These coupling means could take many forms. In the preferred embodiment they are protuberances 36. In the preferred embodiment, the cylinders are molded plastic so that protuberances 36 are readily formed. The protuberances on the cylinders are arranged so that for a particular setting of user dials 22 only certain switch actuators are engaged.

Figure 3:
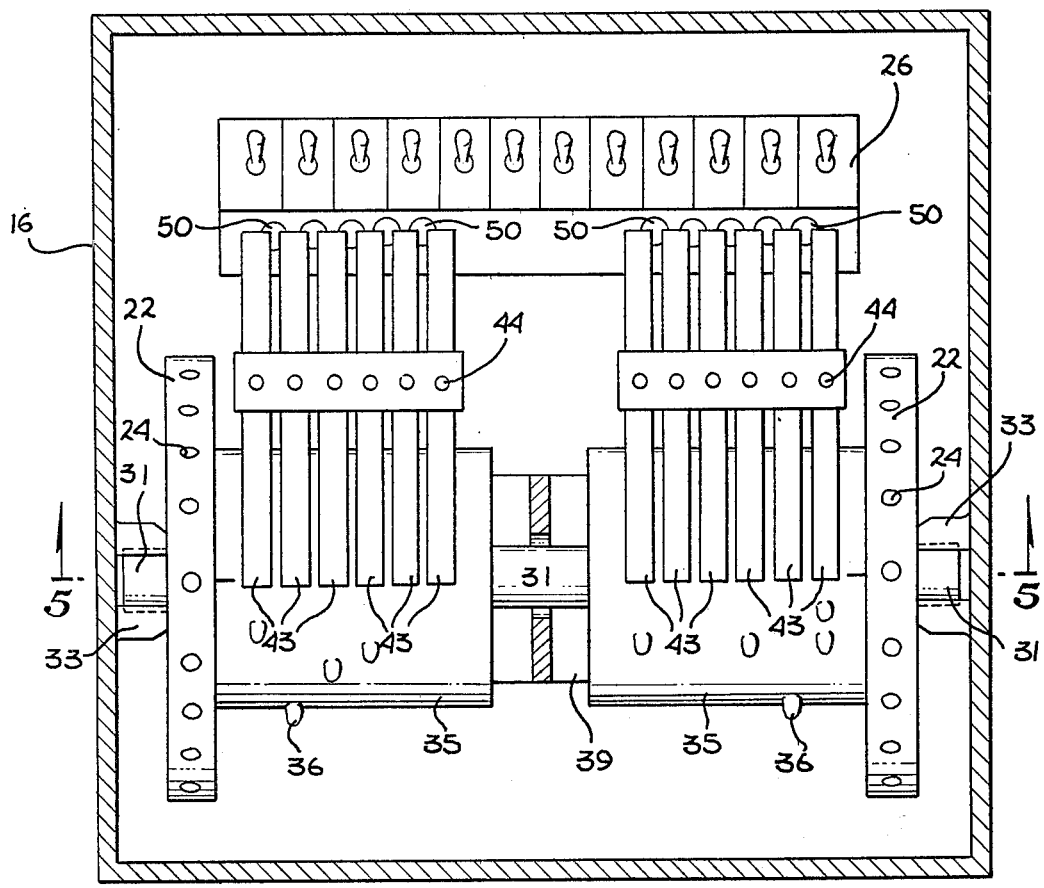
FIG. 3 is a top cutaway view of the device taken along line 3—3 of FIG. 2.

The switch actuators discussed above can take many forms, from ordinary push button switches to microswitches. In the preferred embodiment the switch actuators are levers 43 as shown in FIGS. 2 and 3. As can be seen, levers 43 are positioned in close proximity to cylinders 35 so that for each particular dial setting, protuberances 36 push up against the forward end of selected levers 43.

Those levers against which the protuberances press up pivot about a fulcrum composed of bushings 45 and screw 44 which is attached to top body member 12, shown in FIG. 2, and positioned in journals 93, shown in FIG. 5. The hole in which screw 44 is placed is big enough to allow the lever to pivot. The other end of each lever contacted by the protuberances rotates downward to make contact with a pair of electrical contacts 50.

The protuberances 36 on the cylinders are set so that for each dial setting for entry of a secret code number which corresponds to a series of visible identification information on the card 80, protuberances will press up against eight (8) of the levers. In the preferred embodiment there are more possible dial settings than secret codes; therefore some of the dial settings will be dummy numbers, with the protuberances on the drums pressing up against seven (7) or fewer levers. As will be seen, if a user enters one of the dummy numbers, the electrical circuit which must be completed for the identity authentication indicator lamp 27 to light up would not, upon the closing of the verification switches corresponding to the visible identification information, be completed.

Electrical contacts 50 are wired to verification switches 26. As shown in FIG. 4, each lever that comes down on electrical contacts 50 removes the necessity of closing a corresponding verification switch to complete the electrial circuit. For example, if a protuberance on a drum comes in contact with the lever third from the left, verification switch D need not be closed.

After the card user has entered his secret code on user dials 22, the operator closes the verification switches which correspond to the visible identification information on the user's card. By way of example, if the card user has a card with visible identification information BDFK upon it and the secret code which corresponds to that set of visible identification information is 1826, which code is correctly entered onto the secret code entry dials, the second, fifth, sixth, seventh, ninth, tenth, eleventh and twelfth levers will be contacted by the protuberances on the drums and will come down upon the electrical contacts. Thus upon the operator's closing of verification switches B, D, F and K a completed circuit is made and lamp 27 lights up. If the secret code is a number other than 1826, upon the entry of 1826 on the secret code entry dials by the user one or more of the second, fifth, sixth, seventh, ninth, tenth, eleventh and twelfth levers will not be brought into contact with electrical contacts 50. Therefore, a complete electrical circuit will not be made upon the closing of verification switches B, D, F and K and lamp 27 will not light up, thereby indicating that the person using the card is not an authorized user.

During the assembly of the device of the present invention, axle 31 is slipped through I-beam 39. As shown in FIG. 8, I-beam 39 has opening 91 which is larger than the diameter of axle 31 so that there is longitudinal play between those two members. Cylinders 35 are then slipped over axle 31. Torque springs 57 are next slipped over the axle. One end of each torque spring is attached to each cylinder 35. Next, user dials 22 are slipped over the axle with the other end of each torque spring 57 being attached to each user dial. Each user dail and its respective cylinder are rotated with respect to each other so that the torque spring is stressed. The user dial and the cylinder are then connected together so that the protuberances 36 on the cylinder correspond to the numbers marked on the dial in a predetermined manner. The torque spring is put under compressive force and fits into circular cavity 51. If the cylinder and user dial are not held firmly together, the stressed torque spring will push the cylinder and dial apart and rotate them relative to each other, destroying the relationship between the protuberances 36 and the markings on the user dial. I-beam 39 is positioned so that spacers 37 keep the cylinder and dial compressed together. The assembly described above is then positioned in bottom body member 16, with axle 31 being snap fitted into support members 33 as shown in FIG. 7. Support members 33 are integral with bottom body member 16.

The lower surface of I-beam 39 rests upon bottom body member 16. The upper surface of the I-beam is coated with an adhesive. When top body member 12 is placed over and attached to bottom body member 16, the upper surface of I-beam 39 adheres to the lower surface of the top body member. Thus, if an authorized card user or any other unauthorized person were to attempt to discover the secret code by a visual inspection of the relationship between the user dials and the cylinders with their protuberances, such an attempt would fail. Upon lifting the top body member to open the positive identification device to physical inspection, the I-beam which is adhered to the top body member is pulled up along with it. The remainder of the assembly is held in place by support members 33. Therefore, spacers 37 become disengaged from spacer rims 55, as shown in FIG. 9, whereupon the user dials 22 and cylinders 35 are pushed and spun away from each other. Therefore, the relationship between the dials and the drums is destroyed, thus preventing the discernment of the secret codes which complement the visible identification information.

The authentication devices are easy and inexpensive to manufacture. Also, the alignment of the dials and cylinders can be changed periodically. New cylinder-to-dial relationships create new groupings of resultant electrical connections, thus making the old secret codes inoperative. At the time that the new alignments are made, authorized card users are informed of their new secret codes. Thus, any unauthorized user would not be able to know what the current secret code is for the card he holds.

The system of the present invention is easy to use, requires no insertion of a card in a device, is tamper-proof and costs only battery and lamp bulb replacement to operate. The positive identification device is lightweight and small enough to be held in one hand. It is a self-contained unit and can be carried right to the point of sale, as in a gas station, to a car driver's window, or a restaurant, to the customer's table. Therefore, the positive identification device is capable of widespread acceptance and acts as a strong deterrent to credit card thieves, as well as thieves of other types of instruments.

While the preferred embodiment of the invention has been illustrated and described, it should be understood that it is capable of variation without departing from the principles of the invention and it is my intention to cover by my claims any modified forms or equivalents which may be reasonably included within their scope.

I claim:

1. A positive identification device for verifying the authenticity of the user of a document coded with visible identification information, where the authorized user of said document has been given a secret code for memorization which corresponds to said visible identification information, said device comprising:

a. first entering means comprising at least one user dial for manually entering a user code into said device, said user dial having along its outer edge indicia corresponding to said user code;

b. second entering means comprising at least one operator dial for manually entering said visible identification information into said device, said operator dial having along its outer edge indicia corresponding to said visible identification information;

c. an indicator;

d. a power source;

e. an electrical circuit having an enabled and disabled state, said electrical circuit comprising a plurality of first switches which are responsive in a predetermined manner to said manually entered user code and which have an on state and an off state, and a plurality of second switches equal in number to said first switches, said second switches each having an on state and an off state, said second switches being responsive in a predetermined manner to said manually entered visible identification information, said first switches and said second switches being respectively wired together so that the state of said electrical circuit becomes enabled only upon the changing of state of said first switches being complementary to the changing of state of said second switches, said electrical circuit being connected with said indicator and said power source, said indicator being responsive to said electrical circuit being enabled, said indicator being activated only if said manually entered user code corresponds to said manually entered visible identification information;

f. first actuating means for actuating said first switches, said first actuating means being controlled in a predetermined manner by said first entering means, said first actuating means having a plurality of first coupling members equal in number to said first switches, each of said first coupling members being coupled to a respective said first switch, said first actuating means further having a first axle and at least one first cylinder having a circular cavity at each of its ends, each of said first cylinder's ends having a rim of narrow width, said first cylinder being rotatably mounted upon said first axle, said first cylinder having upon its surface a plurality of first engaging means for cooperatively engaging with said first coupling members, said first engaging means being arranged in a predetermined manner, said first cylinder being located in close proximity to said first coupling members so that said engaging means can engage said first coupling members, each of said first switches being actuated upon its respective said first coupling members being engaged by said first engaging means, said user dial being rotatably mounted on said first axle, said user dial being secured to said first cylinder, said indicia along the outer edge of said user dial being aligned with said first engaging means in a predetermined manner;

g. a first stressed torque spring, said first stressed torque spring surrounding said first axle, said first stressed torque spring being connected to and positioned between said user dial and said first cylinder when said user dial and said first cylinder are secured to each other, said first stressed torque spring being compressed and twisted so that it propels said user dial and said first cylinder apart and causes them to rotate in opposite directions upon their ceasing to be secured together, thereby preventing the detection of the predetermined manner in which said indicia along the outer edge of said user dial and said first engaging means were aligned with each other;

h. at least one first I-beam, the number of said first I-beams greater than one being equal to the number of said first cylinders greater than two, said first I-beam surrounding said first axle, said first I-beam being positioned adjacent said end of said first cylinder opposite said user dial, said first I-beam having spacers of narrow width disposed along its sides and coincident with said rim of said cylinder opposite to said user dial, said spacers being disposed so that said first cylinder and said user dial are compressed together so that they are secured to each other, but would no longer be secured to each other if said first I-beam is displaced a small distance;

i. second actuating means for actuating said second switches, said second actuating means being controlled in a predetermined manner by said second entering means, said second actuating means having a plurality of second coupling members equal in number to said first switches, each of said second coupling members being coupled to a respective said second switch, said second actuating means further having a second axle and at least one second cylinder having a circular cavity at each of its ends, each of said second cylinder's ends having a rim of narrow width, said second cylinder being rotatably mounted upon said second axle, said second cylinder having upon its surface a plurality of second engaging means for cooperatively engaging with said second coupling members, said second engaging means being arranged in a predetermined manner, said second rotating member being located in close proximity to said second coupling members so that said second engaging means can engage said second coupling members, each of said second switches being actuated upon its respective said second coupling member being engaged by said engaging means, said operator dial being rotatably mounted upon said second axle, said operator dial being secured to said second rotating member, said indicia along the outer edge of said operator dial being aligned with said second engaging means in a predetermined manner; and j. a second stressed torque spring, said second stressed torque spring surrounding said second axle, said second stressed torque spring being connected to and positioned between said operator dial and said second cylinder when said operator dial and said second cylinder are secured to each other, said second stressed torque spring being compressed and twisted so that it propels said operator dial and said second cylinder apart and causes them to rotate in opposite directions upon their ceasing to be secured together, thereby preventing the detection of the predetermined manner in which said markings and said second engaging means were aligned with each other.

2. The device of claim 1 further comprising a case member attached to said first I-beam so that upon displacement of said case member, said first I-beam is displaced.

3. The device of claim 1 further comprising at least one second I-beam, the number of said second I-beams greater than one being equal to the number of said second cylinders greater than two, said second I-beam surrounding said second axle, said second I-beam positioned adjacent said end of said second cylinder opposite said operator dial, said second I-beam having spacers of narrow width disposed along its sides and coincident with said rim of said second cylinder opposite said operator dial, said spacers being disposed so that said second cylinder and said operator dial are compressed together so that they are secured to each other, but would no longer be secured to each other if said second I-beam is displaced a small distance.

4. The device of claim 3 further comprising a case member, said case member attached to said first I-beam and said second I-beam so that upon displacement of said case member, said first I-beam and said second I-beam are displaced.

5. A positive identification device for verifying the authenticity of the user of a document coded with visible identification information, where the authorized user of said document has been given a secret code for memorization which corresponds to said visible identification information, said device comprising:

a. first entering means comprising at least one user dial for manually entering a user code into said device, said user dial having along its outer edge indicia corresponding to said user code;

b. second entering means for manually entering said visible identification information into said device;

c. an indicator;

d. a power source;

e. an electrical circuit having an enabled and disabled state, said electrical circuit comprising a plurality of first switches which are responsive in a predetermined manner to said manually entered user code and which have an on state and an off state, and a plurality of second switches equal in number to said first switches, said second switches each having an on state and an off state, said second switches being responsive in a predetermined manner to said manually entered visible identification information, said second entering means composing a plurality of manually operated single throw switching members equal in number to said second switches, said single throw switching members having markings corresponding to said visible identification information, each of said single throw switching members being wired to a respective one of said second switches so that each of said second switches is actuated upon its respective single throw switching member being thrown into the on position, said first switches and said second switches being respectively wired together so that the state of said electrical circuit becomes enabled only upon the changing of state of said first switches being complementary to the changing of state of said second switches, said electrical circuit being connected with said indicator and said power source, said indicator being responsive to said electrical circuit being enabled, said indicator being activated only if said manually entered user code corresponds to said manually entered visible identification information;

f. actuating means for actuating said first switches, said actuating means being controlled in a predetermined manner by said first entering means, said actuating means having a plurality of coupling members equal in number to said first switches, each of said coupling members being coupled to a respective said first switch, said actuating means further having an axle and at lease one cylinder having a circular cavity at each of its ends each of said cylinder's ends having a rim of narrow width, said cylinder being rotatably mounted upon said axle, said cylinder having upon its surface a plurality of engaging means for cooperatively engaging with said coupling members, said engaging means arranged in a predetermined manner, said cylinder being located in a close proximity to said coupling members so that said engaging means can engage said coupling members, each of said first switches being actuated upon its respective said coupling member being engaged by said engaging means, said user dial being rotatably mounted on said axle, said user dial being secured to said cylinder, said indicia along the outer edge of said user dial being aligned with said engaging means in a predetermined manner;

g. a stressed torque spring, said stressed torque spring surrounding said axle, said stressed torque spring being connected to and positioned between said user dial and said cylinder when said user dial and said cylinder are secured to each other, said stressed torque spring being compressed and twisted so that it propels said user dial and said cylinder apart and causes them to rotate in opposite directions upon their ceasing to be secured together, thereby preventing the detection of the predetermined manner in which said indicia along the outer edge of said user dial and said engaging means were aligned with each other; and h. at least one I-beam, the number of said I-beams greater than one being equal to the number of said cylinders greater than two, said I-beam surrounding said axle, said I-beam being positioned adjacent said end of said cylinder opposite said user dial, said I-beam having spacers of narrow width disposed along its sides and coincident with said rim of said cylinder opposite to said user dial, said spacers being disposed so that said cylinder and said user dial are compressed together so that they are secured to each other, but would no longer be secured to each other if said first I-beam is displaced a small distance.

6. The device of claim 5 further comprising a case member attached to said I-beam so that upon displacement of said case member, said I-beam is displaced.

7. The device of claim 6 wherein said first switches are serially connected with each other and each of said second switches is connected in parallel with a respective one of said first switches, thereby forming a plurality of first switching pairs equal in number to said first switches, each of said switching pairs being comprised of one of said first switches and its respective said second switch, and whereby said electrical circuit is enabled only upon the closing of said first switch or said second switch of all of said switching pairs.

8. The device of claim 5 wherein the inputs of all said first switches are connected with each other and the outputs of all said second switches are connected with each other, the output of each of said first switches being serially connected to the input of a respective one of said second switches, thereby forming a plurality of second switching pairs equal in number to said first switches, each of said second switching pairs being comprised of one of said first switches connected in series with its respective one of said second switches, whereby said electrical circuit is enabled only upon the opening of said first switch or said second switch of all of said second switching pairs.

9. The device of claim 5 wherein said engaging means are first protuberances upon said surface of said cylinder, said coupling members are lever members, one end of said lever members being displaced upon being engaged by one of said protuberances, thereby causing said first lever member to rotate about its fulcrum, whereby the other end of said lever member actuates said lever member's respective first switch.

10. The device of claim 5 wherein said cylinder is comprised of molded plastic.

11. The device of claim 5 wherein one of said rims of each of said at least one cylinder has a tooth and notch pattern on it and the side of each of said at least one user dial has a complementary tooth and notch pattern on it so that said user dial and said cylinder mesh with each other and rotate in fixed relation to each other when secured together.

12. The device of claim 5 further comprising a test circuit comprising said power source, said indicator, and a manually operated test switch wired together in series, whereby said indicator is activated upon the closing of said test switch if the device is in working order.

13. The device of claim 5 wherein said power source is a battery.

14. The device of claim 5 wherein said indicator is a lamp.

15. In combination, the positive identification device of claim 5 and a document means adaptable for identity authentication, said document means comprising a document element with said visible identification information recorded on said document element.

* * * * *